(12) United States Patent
Song et al.

(10) Patent No.: US 8,567,007 B2
(45) Date of Patent: Oct. 29, 2013

(54) AIR FLOW SENSING UNIT AND CLEANING APPARATUS HAVING THE SAME

(75) Inventors: Hwa-gyu Song, Gwangju (KR); Min-ha Kim, Gwangju (KR); Jang-keun Oh, Gwangju (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 12/999,277

(22) PCT Filed: Jun. 30, 2008

(86) PCT No.: PCT/KR2008/003830
§ 371 (c)(1),
(2), (4) Date: Dec. 15, 2010

(87) PCT Pub. No.: WO2009/154319
PCT Pub. Date: Dec. 23, 2009

(65) Prior Publication Data
US 2011/0088203 A1    Apr. 21, 2011

(30) Foreign Application Priority Data

Jun. 17, 2008    (KR) .................. 10-2008-0056887

(51) Int. Cl.
*A47L 5/34*    (2006.01)
(52) U.S. Cl.
USPC .................................. 15/339; 15/353; 15/319

(58) Field of Classification Search
CPC ....................................................... A47L 5/34
USPC ..................... 15/339, 353, 319; 55/DIG. 34
See application file for complete search history.

(56) References Cited

U.S. PATENT DOCUMENTS 5,850,183 A  *  12/1998  Berry, III ...................... 340/607
6,467,123 B1     10/2002  Di Nunzio et al.
6,836,930 B2 *  1/2005  Thur et al. ...................... 15/339

FOREIGN PATENT DOCUMENTS

| JP | 2001-198062 | 7/2001 |
| KR | 10-0556836 | 3/2006 |
| WO | WO 2009/154319 | 12/2009 |

* cited by examiner

*Primary Examiner* — Monica Carter
*Assistant Examiner* — Stephanie Berry
(74) *Attorney, Agent, or Firm* — NSIP Law (57) ABSTRACT

An air flow sensing unit, which may sense an amount of air flowing or an pressure for air flown into the cleaning apparatus by a suction motor or an impeller and inform a user of a time for emptying a dirt collecting receptacle of dust or dirt and/or a time for cleaning or replacing a filter with a new one, and a cleaning apparatus having the same are provided. The unit may include an air flow pipe to fluidly communicate an air flow passage of a cleaning apparatus with the outside, and an indicator positioned in the air flow pipe to be lifted based on a change in amount of air flowing or air pressure generated by air movement in the air flow passage and to be lowered due to a weight thereof.

11 Claims, 7 Drawing Sheets

AIR FLOW SENSING UNIT AND CLEANING APPARATUS HAVING THE SAME

CROSS-REFERENCE TO RELATED APPLICATION(S)

This national stage application claims the benefit under 35 USC 119(a)-(d) or (f), or 365(b), of a Korean Patent Application No. 10-2008-0056887, filed on Jun. 17, 2008 in the Korean Intellectual Property Office, and International Patent Application PCT/KR2008/003830 filed on Jun. 30, 2008, the entire disclosures of which are incorporated herein by reference for all purposes.

FIELD

The following description relates to an air flow sensing unit for use in a cleaning apparatus. More particularly, the following description relates to an air flow sensing unit which may be used to inform a user of a time for emptying a dirt collecting receptacle and/or a time for cleaning or replacing a filter with a new one, and a cleaning apparatus having the same.

DESCRIPTION OF RELATED ART

Generally, a vacuum cleaner uses a suction motor to generate a suction force for drawing in air with dirt. The suction motor of the vacuum cleaner is disposed downstream of a dirt collecting apparatus that separates the dirt from the drawn-in air and collects the separated dirt. Thus, the dirt drawn-in with the air by the suction force of the suction motor may be separated from air when passing through the dirt collecting apparatus. Clean air having the dirt removed passes through the suction motor and is then discharged outside the vacuum cleaner.

A vacuum cleaner of the type described above typically includes an air flow sensing unit disposed in an air flow passage in front of the suction motor or the dirt collecting receptacle to inform a user of a time for emptying a dirt collecting receptacle of the dirt and/or a time for cleaning or replacing a filter with a new one. If the sensed amount of air flow is reduced below a certain level, that is, the sensed air pressure is increased close to an atmospheric pressure, the air flow sensing unit informs the user that the dirt collecting receptacle should be emptied and/or a filter should be cleaned or replaced.

One example of a conventional air flow sensing unit includes a dirt indicator in which a movable plate is elastically supported by an elastic spring in an air flow passage to be operable by air passing through the air flow passage. Another example includes a suction force-sensing unit in which a fan is positioned in the air flow passage and rotates by external air and in which a detector is disposed to detect the number of rotations of the fan.

However, because the air flow sensing units described above use an elastic spring or a fan, both of which require a suction force of more than certain level, they may require a vacuum cleaner having a suction motor of high capacity to generate a relatively large suction force in order to operate properly.

A vacuum cleaner, such as a robot cleaner or a stick type cleaner, having a battery used as a power source of the suction motor or a bypass type air flow structure in which an impeller is disposed upstream the dirt collecting apparatus, uses a suction motor or impeller motor of low capacity to generate a relatively small suction force to reduce a consumption of electric power. Therefore, if the conventional air flow sensing units are applied to the vacuum cleaner, such as the robot cleaner or the stick type cleaner, they may be not normally operated, or block off the air flow passage to decrease an efficiency of dirt suction.

Accordingly, it is desired to develop an air flow sensing unit which can be operated or used without any of the above problems even though it is applied to a vacuum cleaner, such as the robot cleaner or the stick type cleaner, using the suction motor or impeller motor of low capacity to generate the relatively small suction force.

SUMMARY

In one general aspect there is provided an air flow sensing unit including an air flow pipe configured to fluidly communicate an air flow passage of a cleaning apparatus with outside atmosphere; and an indicator disposed in the air flow pipe configured to be lifted according to a change in an amount of air flowing or air pressure generated by air movement in the air flow passage and to lower due to a weight of the indicator.

The air flow pipe may include a first part formed to be in fluid communication with an atmospheric pressure and a second part formed to be in fluid communication with the air flow passage.

The air flow pipe may further include one of a reverse U-shaped tube and a reverse L-shaped tube.

The indicator may be disposed in an indicator-moving space formed in the first part of the air flow pipe, to be movable up and down.

The indicator may be formed to have a weight in the range of 3 g through 8 g.

The first part of the air flow pipe in which the indicator-moving space is formed may be formed of a transparent material.

The unit may further include a position sensor to sense a position of the indicator.

The position sensor may include an infrared sensor disposed on a lower portion of the first part of the air flow pipe.

In another aspect, there is provided a cleaning apparatus including a suction nozzle, an air flow passage through which air drawn in through the suction nozzle flows, a dirt collecting unit positioned in the air flow passage configured to separate dirt from the air drawn in through the suction nozzle, and an air flow sensing unit positioned on the air flow passage configured to inform of a time for cleaning the dirt collecting unit.

In yet another aspect, there is provided a cleaning apparatus including a suction nozzle, an air flow passage through which air drawn in through the suction nozzle flows, a dirt collecting unit positioned in the air flow passage configured to separate dirt from the air drawn in through the suction nozzle, and an air flow sensing unit positioned on the air flow passage configured to inform of a time for cleaning the dirt collecting unit. The air flow sensing unit includes an air flow pipe configured to fluidly communicate the air flow passage with outside atmosphere and an indicator disposed in the air flow pipe configured to be lifted based on a change in an amount of air flowing or air pressure generated by air movement in the air flow passage and to be lowered due to a weight of the indicator.

The cleaning apparatus may further include an air suction unit configured to be in fluid communication with the suction nozzle through an entering passage and having an impeller disposed downstream the entering passage. The dirt collecting unit may include at least one dirt collecting receptacle configured to be in fluid communication with at least one exit formed in the air suction unit and at least one filter attached on the at least one dirt collecting receptacle.

The air flow pipe may be positioned on the entering passage.

The cleaning apparatus may further include an air suction unit positioned downstream of the dirt collecting unit and having a suction motor to generate a suction force for drawing in air. The dirt collecting unit may be in fluid communication with an entering passage and include at least one dirt collecting receptacle and at least one filter attached on the at least one dirt collecting receptacle.

The air flow pipe may be positioned on the entering passage.

The cleaning apparatus may include one of a robot cleaner and a stick type cleaner.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
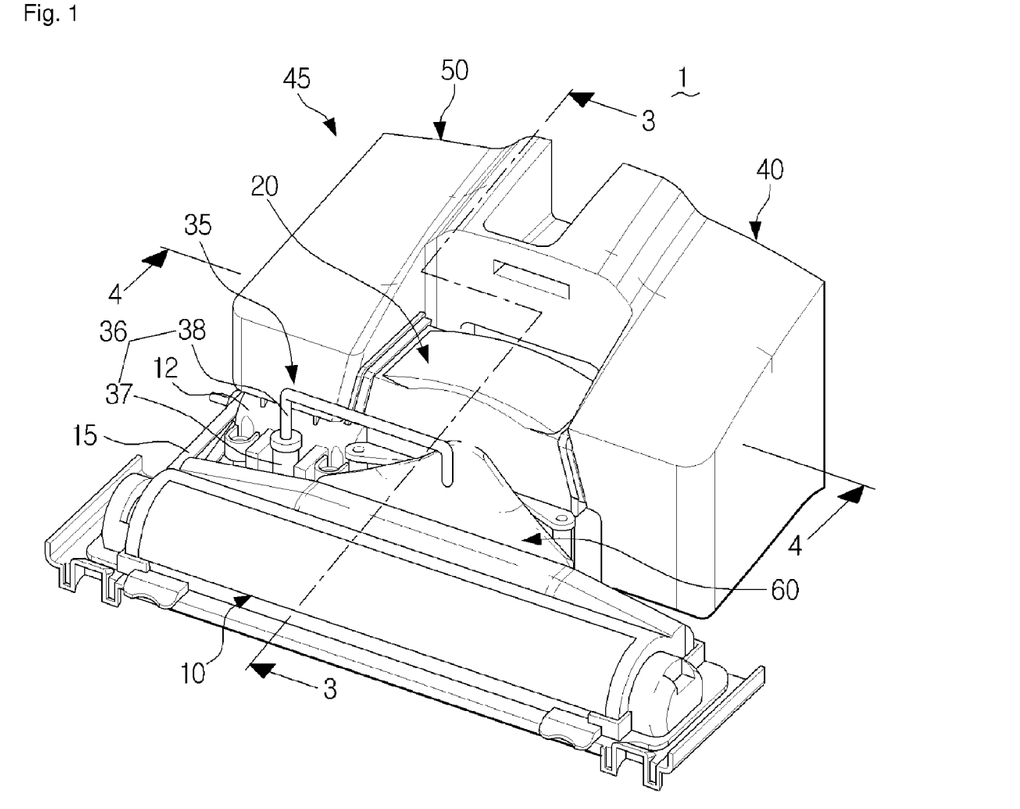
FIG. 1 is a perspective view illustrating an example of a cleaning apparatus having an air flow sensing unit.
Figure 2:
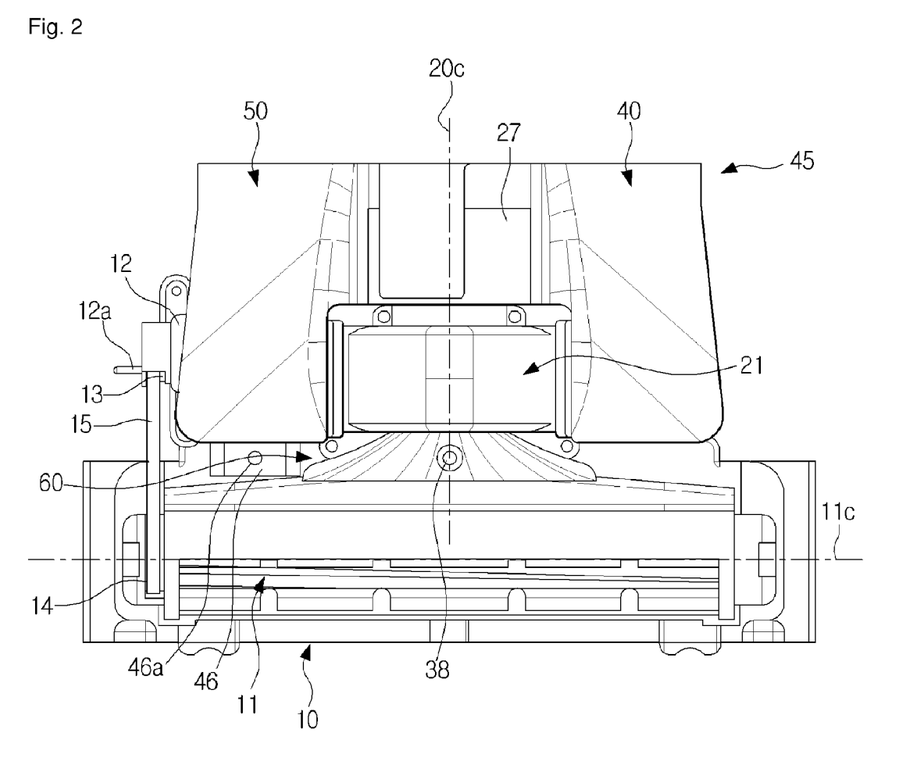
FIG. 2 is a bottom view illustrating the example of the cleaning apparatus of FIG. 1.
Figure 3:
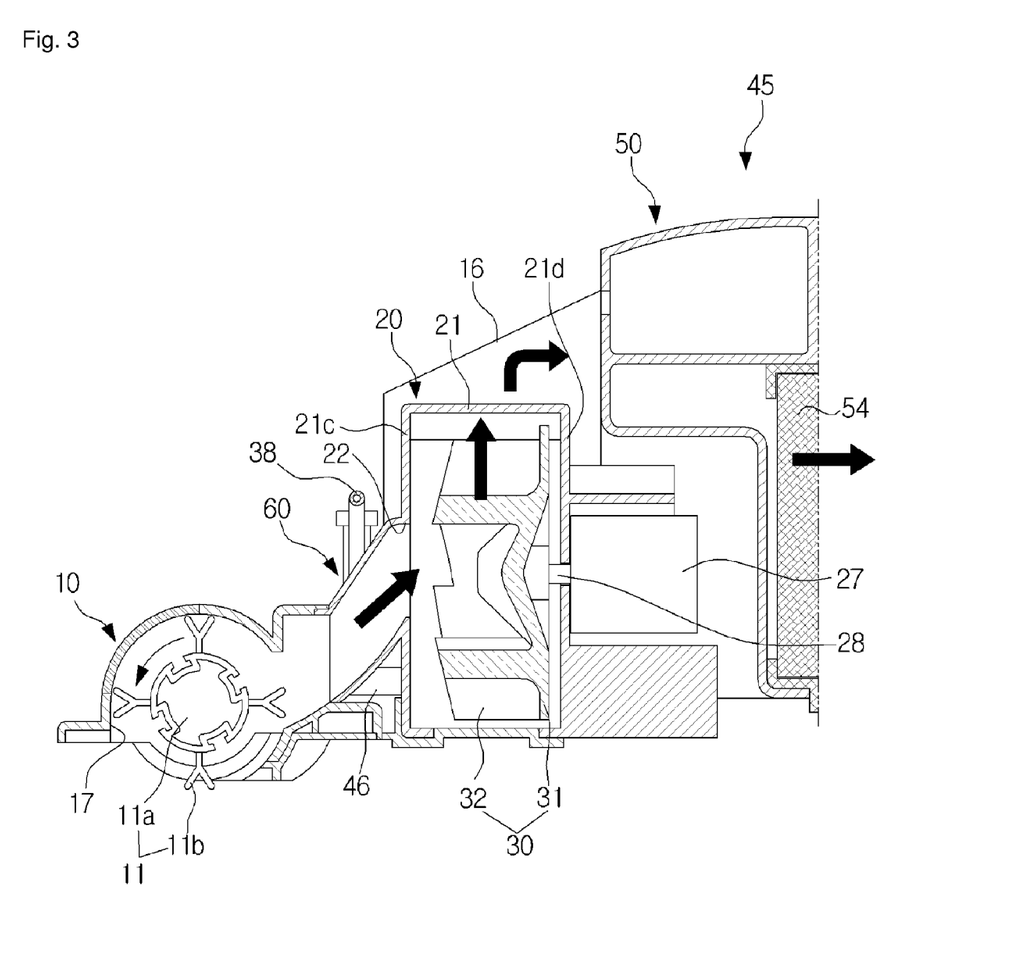
FIG. 3 is a cross-sectional view illustrating the example of the cleaning apparatus of FIG. 1 taken along a line 3-3 in FIG. 1.
Figure 4:
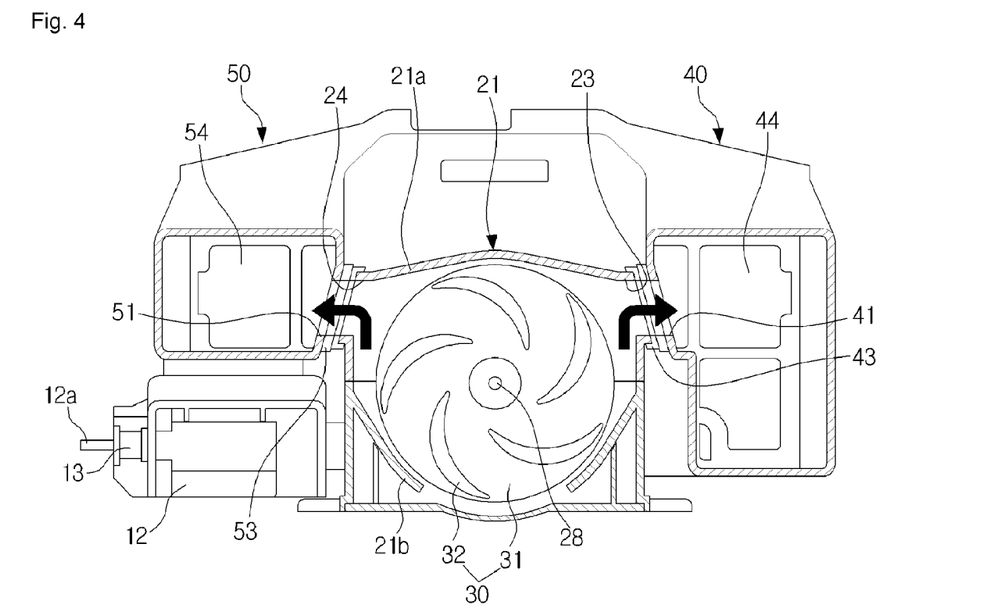
FIG. 4 is a cross-sectional perspective view illustrating the example of the cleaning apparatus of FIG. 1 taken along a line 4-4 in FIG. 1.

FIG. 1 illustrates an example of a cleaning apparatus 1 having an air flow sensing unit. FIG. 2 illustrates the example of the cleaning apparatus 1 of FIG. 1, FIG. 3 illustrates a cross-section of the example of the cleaning apparatus 1 of FIG. 1 taken along a line 3-3 in FIG. 1, and FIG. 4 illustrates a perspective view of a cross-section of the example of the cleaning apparatus 1 of FIG. 1 taken along a line 4-4 in FIG. 1.

Referring to FIGS. 1 to 4, one example of the cleaning apparatus 1, as a bypass type cleaning apparatus, includes a suction nozzle 10, an air suction unit 20, an air flow sensing unit 35, and a dirt collecting unit 45.

The suction nozzle 10 draws in air and dirt from a surface to be cleaned and includes a dirt suction port 17 to face the surface to be cleaned. A rotation brush 11 may be rotatably disposed in the dirt suction port 17. The rotation brush 11 includes a rotation drum 11a and a plurality of brush hairs 11b disposed on a surface of the rotation drum 11a. Therefore, when the rotation brush 11 rotates, the brush hairs 11b may contact the surface to be cleaned and sweep off dirt from the surface to be cleaned, thereby raising the dirt toward an entering passage 60.

The rotation brush 11 may be configured to receive a power from a brush motor 12 and to rotate. The brush motor 12 may be directly connected to the rotation brush 11 to rotate the rotation brush 11. However, the rotation brush is not limited to such a configuration. For example, as illustrated in the example of FIG. 2, a belt 15 may be used to transmit the power of the brush motor 12 to the rotation brush 11. The brush motor 12 is disposed on a body 16 (see FIG. 3) below a second dirt collecting receptacle 50. A driving pulley 13 is disposed at a rotation shaft 12a of the brush motor 12. A driven pulley 14 is disposed at an end of the rotation drum 11a of the rotation brush 11. The belt 15 connects the driving pulley 13 with the driven pulley 14. As a result, when the brush motor 12 rotates, the rotation brush 11 may receive power via the belt 15, thereby rotating.

The air suction unit 20 is disposed apart from the suction nozzle 10 at a side of the suction nozzle 10. The air suction unit 20 may be disposed at a position corresponding to an approximate center of the suction nozzle 10 in the longitudinal direction of the suction nozzle 10. That is, the air suction unit 20, as illustrated in the example of FIG. 2, may be disposed at a rear side of the air suction nozzle 10 so that a center axis 20C of an impeller motor 27 of the air suction unit 20 is disposed substantially at a right angle to a rotation shaft 11C of the rotation brush 11. The air suction unit 20 is connected with the suction nozzle 10 by the entering passage 60. In one example, the entering passage 60 is formed in a duct having an isosceles trapezoid shape. The entering passage 60 is inclined upwardly from the suction nozzle 10 to the air suction unit 20, and is connected to an entrance 22 formed at a center of the air suction unit 20.

The air suction unit 20 includes a housing 21, an impeller 30, and the impeller motor 27.

The housing 21 forms a space in which the impeller 30 may rotate, and together with the entering passage 60 and first and second dirt collecting receptacles 40 and 50 to be described later, forms an air flow passage through which dirt and air drawn-in from the surface to be cleaned may pass. Therefore, the housing 21 may be formed so that the impeller 30 may discharge the dirt and air, which is drawn-in inside the housing 21 through the entrance 22, to first and second exits 23 and 24. In this example, as illustrated in FIG. 4 for instance, a bottom surface 21b of the housing 21 is formed in a curved surface to wrap an approximate half of the impeller 30. A top surface 21a of the housing 21 is formed substantially in a plane having a center portion bent slightly corresponding to the impeller 30. The entrance 22 connecting with the entering passage 60 is formed at a center of a front surface 21c of the housing 21. The two exits 23 and 24, that is, the first and second exits forming two discharging passages are formed at opposite side surfaces of the housing 21. The first and second exits 23 and 24 may be formed symmetric with respect to the rotation shaft 28 of the impeller motor 27. In this example, the housing 21 has two exits 23 and 24. However, the housing 21 may only have one exit or two or more exits as needed. The one exit or two and more exits may be formed to be in fluid communication with one corresponding dirt collecting receptacle or two and more corresponding dirt collecting receptacles, respectively.

The impeller 30 is rotated by the impeller motor 27 so that the impeller 30 generates a suction force capable of drawing in air and dirt from the surface to be cleaned and discharge the dirt and air drawn-in into the housing 21 to the first and second dirt collecting receptacles 40 and 50. The impeller 30 is rotated by the impeller motor 27 disposed outside a rear surface of the housing 21 at an approximate center of the inside of the housing 21.

The impeller 30 includes a rotation plate 31 connected to the rotation shaft 28 of the impeller motor 27 and a plurality of blades 32 disposed on the rotation plate 31. The plurality of blades 32 may be radially arranged on the rotation plate 31 by a predetermined interval. A number of the blades 32 may vary as desired. Noise of the impeller 30 and amount of air that the impeller 30 can draw-in, for example, may be changed according to the number of the blades 32. As a result, the impeller 30 may have four to six blades 32, for example. Also, the blades 32 of the impeller 30 may be formed in various shapes. Noise of the impeller 30 and amount and speed of air that the impeller 30 can draw-in, for example, may be changed according to the shape of the blade 32.

The impeller motor 27 may be disposed outside the housing 21, that is, at the rear surface 21$d$ of the housing 21. The rotation shaft 28 of the impeller motor 27 projects inside the housing 21. The impeller 27 is disposed at the end of the rotation shaft 28 of the impeller motor 27. As a result, when the impeller motor 27 rotates, the impeller 30 may rotate, thereby generating a suction force. The suction force may draw in dirt and air into the housing 21 from a surface to be cleaned. Because the impeller motor 27 is disposed at the rear surface 21$d$ of the housing 21, the dirt and air drawn-in by the impeller 30 may not pass through the impeller motor 27. That is, the dirt and air drawn-in by the impeller 30 may bypass or contour the impeller motor 27, and then, may be collected into the first and second dirt collecting receptacles 40 and 50.

The air flow sensing unit 35 may sense an amount of air flowing or a pressure for the air drawn in into the entering passage 60 by the impeller 30 and inform a user of a time for emptying the first and second dirt collecting receptacles 40 and 50 and/or a time for cleaning or replacing first and second filters 44 and 54 with new ones. For this, the air flow sensing unit 35 may be disposed on the entering passage 60 at the rear side of the suction nozzle 10.

Figure 5:
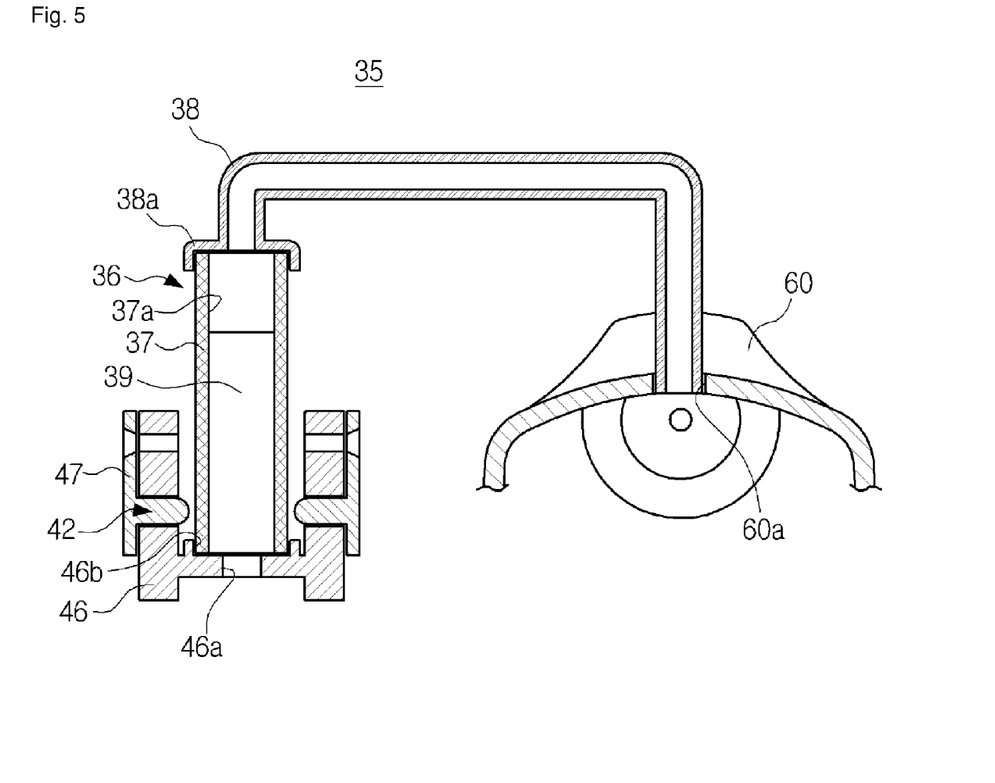
FIG. 5 is a cross-sectional perspective view illustrating an example of the air flow sensing unit of the cleaning apparatus of FIG. 1.
Figure 6:
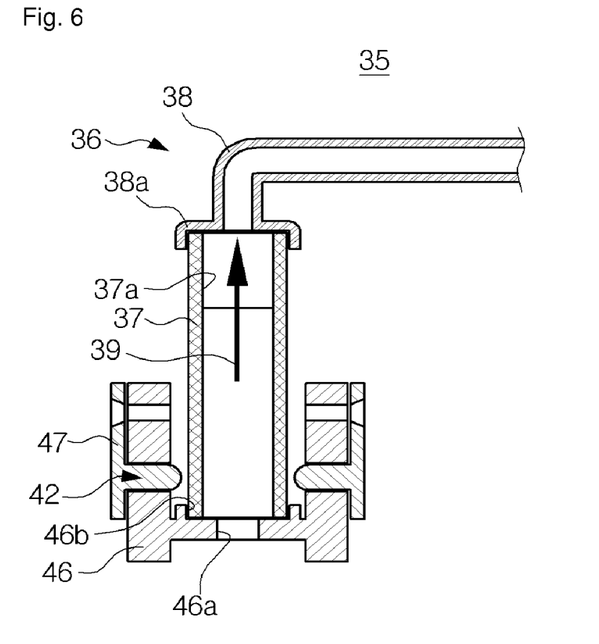
FIG. 6 is a cross-sectional view illustrating an operation of the example of the air flow sensing unit of FIG. 5.
Figure 7:
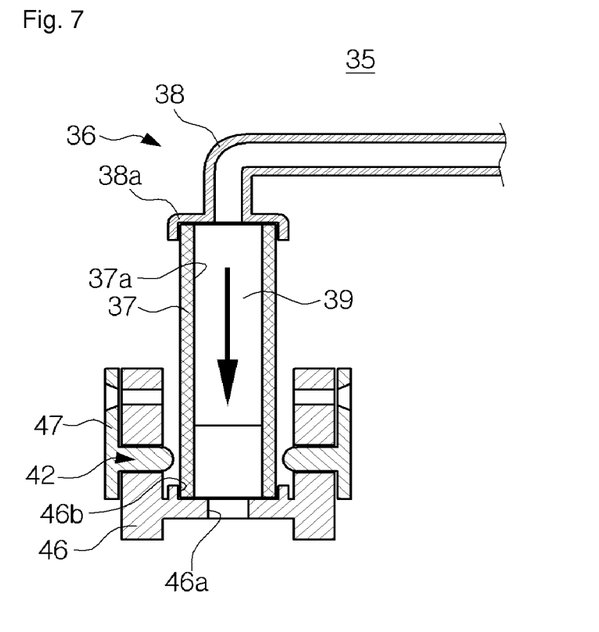
FIG. 7 is a cross-section view illustrating another operation of the example of the air flow sensing unit of FIG. 5.

As illustrated in the examples of FIGS. 5 through 7, the air flow sensing unit 35 includes an air flow pipe 36, an indicator 39, and a position sensor 42.

In the illustrated examples, the air flow pipe 36 is disposed on an upper side of the entering passage 60 to be in fluid communication with the entering passage 60, and has a first part 37 formed to be in fluid communication with an atmospheric pressure and a second part 38 formed to be in fluid communication with the entering passage 60. The first part 37 may be formed in a cylinder shape having an indicator-moving space 37$a$ in which the indicator 39 is inserted to be movable up and down. In this example, the first part 37, at a lower end thereof, is aligned with an air inlet 46$a$ of a sensor fixing bracket 46 and vertically inserted in a receiving groove 46$b$ of the sensor fixing bracket 46. The sensor fixing bracket 46 is disposed on the body 16 in front of a lower portion of the second dirt collecting receptacle 50. Alternatively, a lower end of the first part 37 may be configured in a closed structure having a separate air inlet (not illustrated), so that it may be supported on the sensor fixing bracket 46 or maintained away from the sensor fixing bracket 46 in a free state. Also, the sensor fixing bracket 46 may be disposed on a surface of the rear side of the suction nozzle 10.

The first part 37 may be formed of a transparent material to pass light emitted from a light emitting part of the position sensor 42 to be further described below.

The second part 38 forms a fluid communicating path to transmit a pressure in the entering passage 60 to the indicator-moving space 37$a$, and connects a fluid communicating opening 60$a$ formed on the upper side of the entering passage 60 with the first part 37. For this, the second part 38 may be formed in an asymmetric reverse U-shaped form, which has a long end inserted in the fluid communicating opening 60$a$ and a short end having a receiving part 38$a$ formed to accommodate an upper end of the first part 37.

Figure 8:
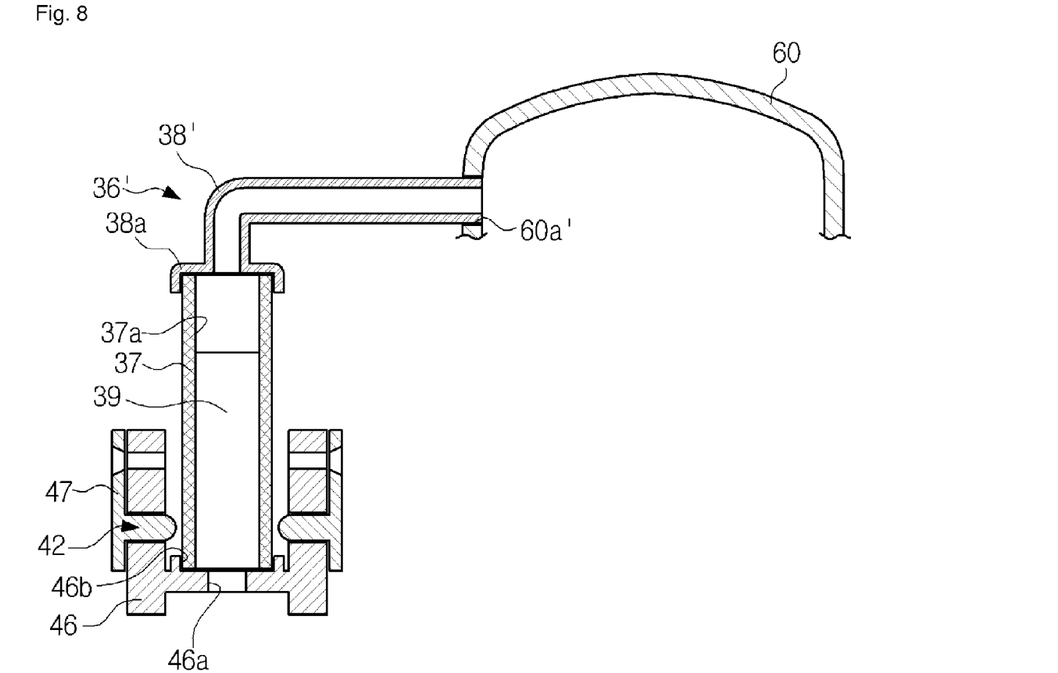
FIG. 8 is a cross-sectional perspective view illustrating a modified example of the air flow sensing unit of the cleaning apparatus of FIG. 1.

In this example, the air flow pipe 36 forms a symmetric reverse U-shaped tube as a whole as the first and the second parts 37 and 38 are made one. However, as illustrated in the example of FIG. 8, the air flow pipe may also be configured to form a reverse L-shaped tube 36' where suitable. In this case, a second part 38' is formed in a reverse L-shaped form, so that one end thereof is inserted in a fluid communicating opening 60$a$' formed on a side surface of the entering passage 60 and the other end thereof has a receiving part 38$a$ formed to accommodate the upper end of the first part 37.

The indicator 39 is inserted in the indicator-moving space 37$a$ formed in the first part 37 of the air flow pipe 36, so that the indicator 39 may be moved up and down in the indicator-moving space 37$a$. The indicator 39 lifts due to a change in amount of air flowing or air pressure generated by air movement in the entering passage 60 transmitted to the indicator-moving space 37$a$ via the second part 38 and lowers due to its own weight. That is, as in a normal operation state where the first and second dirt collecting receptacles 40 and 50 are empty or the first and second filters 44 and 54 are not choked with dirt, if there is a sufficient of amount of air flown into the entering passage 60 by the impeller 30, that is, air pressure in the entering passage 60 is lower than the atmospheric pressure, the indicator 39 lifts up due to a pressure of air entering the indicator-moving space 37$a$ via the air inlet 46$a$ of the sensor-fixing bracket 46 against a weight thereof. To the contrary, as in an abnormal operation state where the first and second dirt collecting receptacles 40 and 50 are full of dirt or the first and the second filters 44 and 54 are choked with dirt, if there is small or little amount of air flown into the entering passage 60 by the impeller 30, that is, air pressure in the entering passage 60 is almost equal to the atmospheric pressure, the indicator 39 lowers due to its own weight. Here, preferably, but not necessarily, the indicator 39 is formed to have a weight in the range of 3 g through 8 g, so that it can be easily lifted even by weak movement of air.

The position sensor 42 may sense a position of the indicator 39. The position sensor 42 may be disposed on a lower portion of the first part 37 of the air flow pipe 36. In this example, the position sensor 42 is disposed on a substrate 47 and the substrate 47 is fixed to the sensor fixing bracket 46 by screws, so that the position sensor 42 is spaced apart from the lower portion of the first part 37 while facing the lower portion of the first part 37. However, where suitable, the substrate 47 on which the position sensor 42 is disposed may be directly installed on the lower end of the first part 37 of the air flow pipe 36 without using the sensor fixing bracket 46, so that the position sensor 42 is arranged in the lower portion of the first part 37. In this case, the first part 37 of the air flow pipe 36 may be formed of other proper material, for example, non-transparent material, instead of the transparent material.

The position sensor may be composed of an infrared sensor having a light emitting part and a light receiving part. However, the position sensor is not limited to such components.

Accordingly, as illustrated in the example of FIG. 7, when the indicator 39 is in a lifted position, the position sensor 42 generates an ON signal as light emitted from the light emitting part is received by the light receiving part after passing through the first part 37 of the air flow pipe 36. According to the ON signal from the position sensor 42, a controller (not illustrated) may determine that the cleaning apparatus 1 is in a normal operation state of operation. To the contrary, as illustrated in FIG. 6, when the indicator 39 is in a lowered position, the position sensor 42 generates an 'OFF' signal as light emitted from the light emitting part is blocked by the indicator 37 and thus not received by the light receiving part after passing through the first part 37 of the air flow pipe 36. According to the 'OFF' signal from the position sensor 42, the controller may determine that the cleaning apparatus 1 is in a abnormal operation state, and stop the impeller motor 27 and the brush motor 12 of the cleaning apparatus 1 after raising an alarm through a speaker and/or a lamp (not illustrated).

The dirt collecting unit 45 includes first and second dirt collecting receptacles 40 and 50, and first and second filters 44 and 54. The first and second dirt collecting receptacles 40 and 50 are disposed in the body 16 at both sides of the air suction unit 20, and collect dirt discharged from the housing 21 of the air suction unit 20. At this time, the first and second dirt collecting receptacles 40 and 50 may be disposed symmetric with respect to the air suction unit 20. Also, the first and second dirt collecting receptacles 40 and 50 may be formed to wrap a rear side of the impeller motor 27 of the air suction unit 20. Therefore, the air suction unit 20 may be located at an approximate center between the first and second dirt collecting receptacles 40 and 50. The first and second dirt collecting receptacles 40 and 50 may be formed so that they are spaced apart from the suction nozzle 10 and are not positioned directly above the suction nozzle 10. The brush motor 12 may be disposed below anyone of the first and second dirt collecting receptacles 40 and 50. In this example, the brush motor 12 is disposed below the second dirt collecting receptacle 50.

The first dirt collecting receptacle 40 includes a first dirt inlet 41 in fluid communication with the first exit 23 of the housing 21, and the second dirt collecting receptacle 50 includes a second dirt inlet 51 in fluid communication with the second exit 24 of the housing 21. The first exit 23 of the housing 21 is connected with the first dirt inlet 41 of the first dirt collecting receptacle 40. A first sealing member 43 is disposed between the first exit 23 and the first dirt inlet 41. Therefore, the first exit 23 of the housing 21 and the first dirt inlet 41 of the first dirt collecting receptacle 40 form a first discharging passage through which dirt and air discharged from the housing 21 pass. Also, the second exit 24 of the housing 21 is connected with the second dirt inlet 51 of the second dirt collecting receptacle 50. A second sealing member 53 is disposed between the second exit 24 and the second dirt inlet 51. Therefore, the second exit 24 of the housing 21 and the second dirt inlet 51 of the second dirt collecting receptacle 50 form a second discharging passage through which dirt and air discharged from the housing 21 pass.

The dirt discharged from the first and second exits 23 and 24 of the housing 21 fall by its own weight and accumulate inside each of the first and second dirt collecting receptacles 40 and 50.

Each of first and second filters 44 and 54 is disposed at a rear side of each of the first and second dirt collecting receptacles 40 and 50. Therefore, air discharged with dirt from the first and second exit 23 and 24 of the housing 21 is exhausted outside through the first and second filters 44 and 54, respectively. The first and second filters 44 and 54 separate fine dirt, which do not fall by its own weight and move with the air, from the air.

Although not illustrated, the cleaning apparatus 1 according to one example includes an electric power portion supplying electric power to the brush motor 12 and the impeller motor 27, and a controller controlling the brush motor 12 and the impeller motor 27. The electric power portion may use a battery (not illustrated) mounted to the cleaning apparatus 1 or a commercial electric power source disposed separately from the cleaning apparatus 1. When using the commercial electric power source, the cleaning apparatus 1 has a power cord (not illustrated) capable of connecting to the commercial electric power source. The controller may be similar to a controller of the conventional vacuum cleaner, except that according to the 'OFF' signal from the position sensor 42, it determines that the cleaning apparatus 1 is in the abnormal operation state and stops the impeller motor 27 and the brush motor 12 of the cleaning apparatus 1 after raising the alarm through the speaker and/or the lamp; therefore, additional description thereof is omitted.

Figure 9:
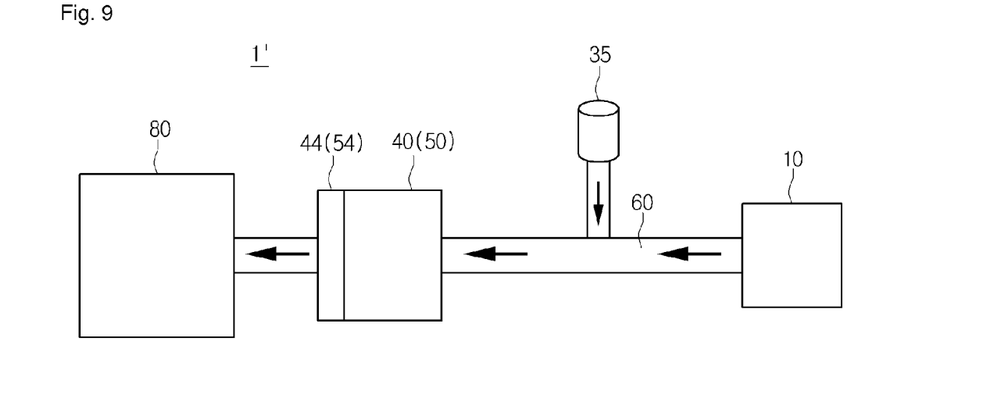
FIG. 9 is a diagram illustrating another example of a cleaning apparatus having an air flow sensing unit.

As described above, although the cleaning apparatus 1 is illustrated and explained as applied to the bypass type cleaning apparatus in which the drawn-in dirt and air do not pass through the impeller motor 27, instead passing through the housing 21 in which the impeller 30 is disposed and are discharged to the first and the second dirt collecting receptacles 40 and 50, the subject matter of the instant application is not limited thereto. For instance, as illustrated in the example of FIG. 9, a cleaning apparatus 1' may be applied to a general low flow cleaning apparatus. At this time, the cleaning apparatus 1' is configured, so that dirt and air drawn in through the suction nozzle 10 pass through the first and second dirt collecting receptacles 40 and 50 and the first and the second filters 44 and 54 via the entering passage 60 on which the air flow sensing unit 35 is disposed, pass through a suction motor 80, and are then discharged to outside.

Also, although the example of the cleaning apparatus 1 is illustrated and explained as configured, so that the air flow sensing unit 35 has the position sensor 42 and the speaker and/or the lamp to raise the alarm to the outside according to the signal of the position sensor 42, thereby allowing the controller to determine that the cleaning apparatus 1 is in the normal operation state and to raise the alarm through the speaker and/or the lamp and stop the operation of the cleaning apparatus 1, the example is not limited thereto. That is, because the first part 37 of the air flow pipe 36 in which the indicator-moving space 37a is formed of the transparent material to allow the user to see the indicator-moving space 37a from the outside, the position sensor 42 and the speaker and/or the lamp may be excluded from the cleaning apparatus 1 in certain situations. In this case, the user may recognize the position of the indicator 39 from the outside with the naked eye and determine a time for emptying the first and second dirt collecting receptacles 40 and 50 of dirt and/or a time for cleaning or replacing the first and second filters 44 and 54 according to the position of the indicator 39 in operation of the cleaning apparatus 1. As a result, a fabrication cost of the cleaning apparatus 1 may be reduced.

Hereinafter, an example of the operation of the cleaning apparatus 1 shown in the examples of FIGS. 1 to 7 is discussed.

When electric power is applied to the brush motor 12 and the impeller motor 27, the rotation brush 11 and the impeller 30 rotate. When the rotation brush 11 rotates, the brush hairs 11b of the rotation brush 11 contacting the surface to be cleaned separate dirt from the surface to be cleaned and raise the dirt to the entering passage 60.

When the impeller 30 rotates, the dirt separated from the surface to be cleaned by the rotation brush 11 enters the entrance 22 of the housing 21 via the entering passage 60 with air. The air and dirt entering inside the housing 21 via the entrance 22 thereof are discharged through the first and second exits 23 and 24 of the housing 21 by centrifugal force generated by the rotation of the impeller 30. At this time, some dirt collides with the plurality of blades 32 of the impeller 30, and is discharged through the first and second exits 23 and 24 of the housing 21 by impact force therebetween.

The dirt and air discharged from the first exit 23 enter the first dirt collecting receptacle 40 through the first dirt inlet 41. The dirt entering the first dirt collecting receptacle 40 falls by its own weight and accumulates on a bottom surface of the first dirt collecting receptacle 40. The air is discharged outside via the first filter 44 of the first dirt collecting receptacle 40. The dirt and air discharged from the second exit 24 enter the second dirt collecting receptacle 50 through the second dirt inlet 51. Just as the dirt and air entering the first dirt collecting receptacle 40, the dirt entering the second dirt collecting receptacle 50 fall by its own weight and accumulate on a bottom surface of the second dirt collecting receptacle 50, and the air is discharged outside via the second filter 54 of the second dirt collecting receptacle 50.

At this time, if the cleaning apparatus 1 is operated in a normal state where the first and second dirt collecting receptacles 40 and 50 are empty or the first and second filters 44 and 54 are not choked with dirt, the indicator 39 lifts up from a position illustrated in FIG. 6 to a position illustrated in FIG. 7 due to a pressure of air entering the indicator-moving space 37a via the air inlet 46a of the sensor-fixing bracket 46 against a weight thereof. As a result, the position sensor 42 generates an ON signal, and according to the ON signal from the position sensor 42, the controller determines that the cleaning apparatus 1 is in a normal operation state. Alternatively, if the cleaning apparatus 1 is operated in an abnormal state that the first and second dirt collecting receptacles 40 and 50 are full of dirt or the first and second filters 44 and 54 are choked with dirt, the indicator 39 lowers from the position illustrated in FIG. 7 to the position illustrated in FIG. 6 due to its own weight, and the position sensor 42 generates an 'OFF' signal. According to the 'OFF' signal from the position sensor 42, the controller determines that the cleaning apparatus 1 is in an abnormal operation state, and stops the impeller motor 27 and the brush motor 12 of the cleaning apparatus 1 after raising an alarm through the speaker and/or the lamp. According to the alarm from the speaker and/or the lamp, a user may check the first and second dirt collecting receptacles 40 and 50 and the first and second filters 44 and 54, and empty the first and second dirt collecting receptacles 40 and 50 of dirt, or cleans or replaces the first and second filters 44 and 54.

As described above, the cleaning apparatus 1 uses the air flow sensing unit 35 having the indicator, which may lift according to the change in amount of air flowing or air pressure generated by the small air movement in the air flow passage and lower due to own weight thereof. Therefore, even though the cleaning apparatus 1 is applied to a low flow cleaning apparatus, such as a robot cleaner or a stick type cleaner, using a suction motor or impeller motor of low capacity, a problem may not occur where it is not normally operated or block off the air flow passage to decrease an efficiency of dirt suction, as in the conventional air flow sensing units.

Figure 10:
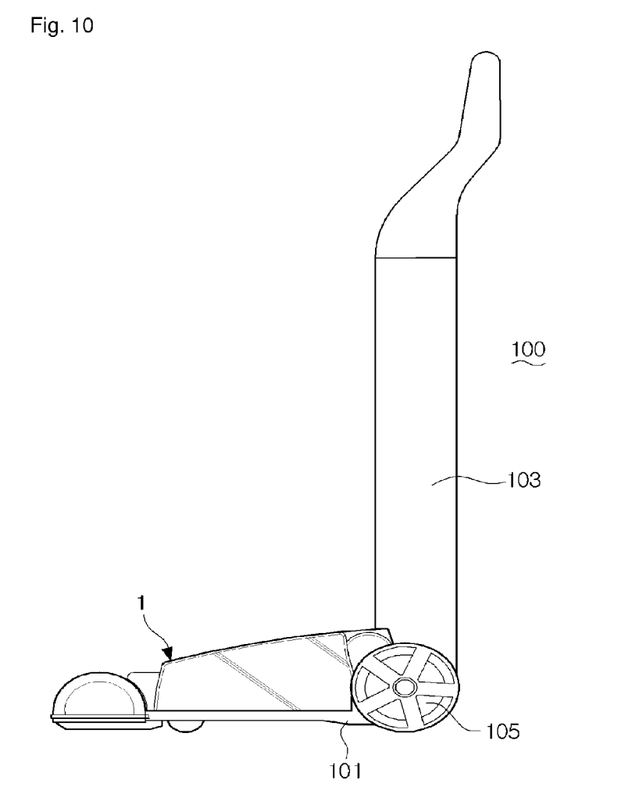
FIG. 10 is a side view illustrating an example of a stick type cleaning apparatus using a cleaning apparatus with an air flow sensing unit.
Figure 11:
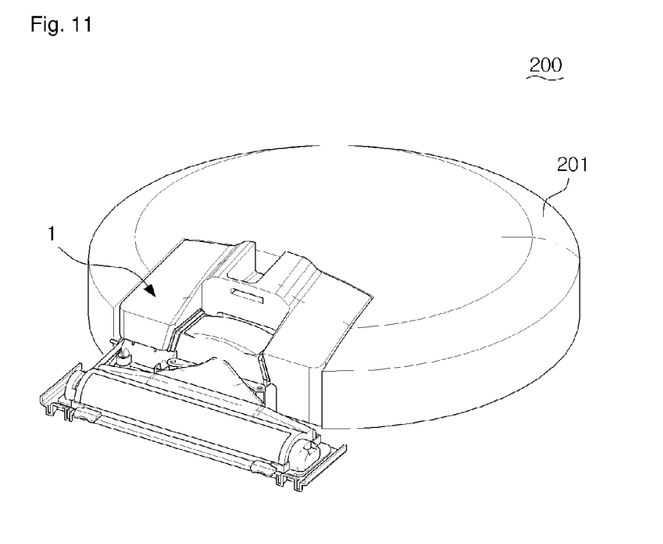
FIG. 11 is a side view illustrating an example of a robot cleaner using a cleaning apparatus with an air flow sensing unit.

FIG. 10 is a side view illustrating a stick type cleaning apparatus 100 using the cleaning apparatus 1 and FIG. 11 is a side view illustrating a robot cleaner 200 using the cleaning apparatus 1.

Referring to the example in FIG. 10, the stick type cleaning apparatus 100 includes a cleaner body 101 in which the cleaning apparatus 1 is disposed, and a stick handle 103 for controlling the cleaner body 101. A pair of wheels 105 is disposed at both sides of the cleaner body 101, thereby allowing the cleaner body 101 to move. Therefore, a user holds the stick handle 103, and moves the cleaner body 101 in which the cleaning apparatus 1 is disposed to clean.

Referring to the example in FIG. 11, the robot cleaner 200 has a robot body 201 in which the cleaning apparatus 1 is disposed. The robot body 201 includes a driving portion (not illustrated) allowing the robot cleaner 200 to move, a robot controller (not illustrated) controlling the robot cleaner 200 to recognize (or perceive) autonomously a position thereof and to perform a cleaning task, and a battery (not illustrated). The battery supplies electric power to the cleaning apparatus 1, the driving portion, and the robot controller. Therefore, the robot cleaner 200 may autonomously move and perform the cleaning task using the cleaning apparatus 1.

The subject matter of the present application has been developed to address the above drawbacks and other problems associated with the conventional arrangements. An aspect of the examples above is to provide an air flow sensing unit, which may be applied to a low flow cleaning apparatus, such as a robot cleaner or a stick type cleaner, to sense an amount of air flowing or an pressure for air flown into the cleaning apparatus by a suction motor or an impeller and to inform a user of a time for emptying a dirt collecting receptacle of dirt and/or a time for cleaning or replacing a filter with a new one, and a cleaning apparatus having the same.

The above aspects and/or other feature may be achieved by providing an air flow sensing unit, which includes an air flow pipe to fluidly communicate an air flow passage of a cleaning apparatus with outside, and an indicator disposed in the air flow pipe to lift according to an change in amount of air flowing or air pressure generated by air movement in the air flow passage and to lower due to own weight thereof.

The air flow sensing unit having a structure as described above and the cleaning apparatus having the same have the indicator, which may lift according to an change in amount of air flow or air pressure generated by air movement in the air flow passage and lower due to own weight thereof. Therefore, even though the air flow sensing unit or the cleaning apparatus having the same may be applied to a low flow cleaning apparatus cleaner, such as a robot cleaner or a stick type cleaner, using a suction motor or impeller motor of low capacity, The problems and drawbacks of the conventional units described above may be avoided.

In addition, the air flow sensing unit and the cleaning apparatus having the same may be configured so that the first part of the air flow pipe in which the indicator-moving space is formed is made of transparent material. Thus, even though the position sensor to sense the position of the indicator and alarm means, such as a speaker, a lamp, etc., to inform of the position of the indicator, may not be included in suitable situations, the user may recognize the position of the indicator from outside with the naked eye and determine a time for emptying the dirt collecting receptacle of dirt and/or a time for cleaning or replacing the filter in operation of the cleaning apparatus. In this case, a fabrication cost of the cleaning apparatus may be reduced.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or equivalents. Accordingly, other implementations are within the scope of the following claims.

The invention claimed is:

1. An air flow sensing unit, comprising:
an air flow pipe configured to fluidly communicate an air flow passage of a cleaning apparatus with outside atmosphere; and
an indicator disposed in the air flow pipe configured to be lifted according to a change in an amount of air flowing or air pressure generated by air movement in the air flow passage and to lower due to a weight of the indicator,
wherein the air flow pipe comprises:
a first part formed to be in fluid communication with an atmospheric pressure;
a second part formed to be in fluid communication with the air flow passage; and
a position sensor to sense a position of the indicator; and
wherein the position sensor comprises an infrared sensor disposed on a lower portion of the first part of the air flow pipe.

2. The unit of claim 1, wherein the air flow pipe further comprises one of a reverse U-shaped tube and a reverse L-shaped tube.

3. The unit of claim 1, wherein the indicator is disposed in an indicator-moving space formed in the first part of the air flow pipe, to be movable up and down.

4. The unit of claim 3, wherein the indicator is formed to have a weight in the range of 3 g through 8 g.

5. The unit of claim 3, wherein the first part of the air flow pipe in which the indicator-moving space is formed is formed of a transparent material.

6. A cleaning apparatus, comprising:
a suction nozzle:
an air flow passage through which air drawn in through the suction nozzle flows;
a dirt collecting unit positioned in the air flow passage configured to separate dirt from the air drawn in through the suction nozzle; and
an air flow sensing unit positioned on the air flow passage configured to inform of a time for cleaning the dirt collecting unit,
wherein the air flow sensing unit comprises:
an air flow pipe configured to fluidly communicate the air flow passage with outside atmosphere; and
an indicator disposed in the air flow pipe configured to be lifted based on a change in an amount of air flowing or air pressure generated by air movement in the air flow passage and to be lowered due to a weight of the indicator;
wherein the air flow pipe comprises:
a first part formed to be in fluid communication with an atmospheric pressure;
a second art formed to be in fluid communication with the aft flow passage; and
a position sensor to sense a position of the indicator; and
wherein the position sensor comprises an infrared sensor disposed on a lower portion of the first part of the air flow pipe.

7. The cleaning apparatus of claim 6, further comprising:
an air suction unit configured to be in fluid communication with the suction nozzle through an entering passage and having an impeller disposed downstream the entering passage,
wherein the dirt collecting unit comprises:
at least one dirt collecting receptacle configured to be in fluid communication with at least one exit formed in the air suction unit; and
at least one filter attached on the at least one dirt collecting receptacle.

8. The cleaning apparatus of claim 7, wherein the air flow pipe is positioned on the entering passage.

9. The cleaning apparatus of claim 6, further comprising:
an air suction unit positioned downstream of the dirt collecting unit and having a suction motor to generate a suction force for drawing in air,
wherein the dirt collecting unit is in fluid communication with an entering passage and comprises at least one dirt collecting receptacle and at least one filter attached on the at least one dirt collecting receptacle.

10. The cleaning apparatus of claim 9, wherein the air flow pipe is positioned on the entering passage.

11. The cleaning apparatus of claim 6, wherein the cleaning apparatus comprises one of a robot cleaner and a stick type cleaner.

* * * * *